(12) United States Patent
Blum et al.

(10) Patent No.: US 10,218,257 B2
(45) Date of Patent: Feb. 26, 2019

(54) POWER CONVERTER HAVING PARALLEL-CONNECTED SEMICONDUCTOR SWITCHES

(71) Applicant: Siemens Aktiengesellschaft, Munich (DE)

(72) Inventors: Manuel Blum, Ottobrunn (DE); Walter Kiffe, Kirchheim (DE); Thomas Komma, Ottobrunn (DE); Monika Poebl, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/579,282

(22) PCT Filed: Jun. 8, 2016

(86) PCT No.: PCT/EP2016/063051
§ 371 (c)(1),
(2) Date: Dec. 4, 2017

(87) PCT Pub. No.: WO2016/198460
PCT Pub. Date: Dec. 15, 2016

(65) Prior Publication Data
US 2018/0152094 A1    May 31, 2018

(30) Foreign Application Priority Data
Jun. 12, 2015   (DE) .................. 10 2015 210 796

(51) Int. Cl.
*H02M 1/088* (2006.01)
*H02M 7/00* (2006.01)
(Continued)

(52) U.S. Cl.
CPC ............. *H02M 1/088* (2013.01); *H02J 1/102* (2013.01); *H02M 7/003* (2013.01); *H02M 7/08* (2013.01); *H02M 2001/007* (2013.01)

(58) Field of Classification Search
CPC ........ H02M 1/088; H02M 7/08; H02M 7/003; H02M 2001/007; H02M 1/08; H02J 1/102
See application file for complete search history.

(56) References Cited

U.S. PATENT DOCUMENTS

| 5,170,337 A | 12/1992 | Borowiec et al. ............ 363/147 |
| 5,459,356 A | 10/1995 | Schulze et al. ............... 257/773 |

(Continued)

FOREIGN PATENT DOCUMENTS

| DE | 102012205725 A1 | 10/2013 | .............. H02M 1/00 |
| DE | 102013211412 A1 | 12/2014 | ............ H02M 1/088 |

(Continued)

OTHER PUBLICATIONS

German Office Action, Application No. 102015210796.5, 9 pages, dated Sep. 22, 2015.

(Continued)

*Primary Examiner* — Emily P Pham
(74) *Attorney, Agent, or Firm* — Slayden Grubert Beard PLLC

(57) ABSTRACT

The present disclosure relates to electric converters. The teachings thereof may be embodied in an electric converter to transfer an electric power of more than 3 kilowatts comprising a half-bridge with at least two parallel circuits. Each of the parallel circuits includes a plurality of semiconductor switches. Each of the parallel circuits includes at least two base circuits arranged next to one another on a common printed circuit board. Each of the respective base circuits includes one of the plurality of semiconductor switches and (Continued)

a gate driver circuit for the semiconductor switch. Each gate driver circuit is electrically connected to a gate of the semiconductor switch by a control line. In each of the parallel circuits, a shortest control line and a longest control line differ from one another with respect to length by no more than the factor of 1.5.

11 Claims, 4 Drawing Sheets

(51) Int. Cl.
*H02J 1/10* (2006.01)
*H02M 7/08* (2006.01)
*H02M 1/00* (2006.01)

(56) References Cited

U.S. PATENT DOCUMENTS

| | | | |
|---|---|---|---|
| 6,388,316 B1 | 5/2002 | Matsumoto | 257/700 |
| 7,138,698 B2 * | 11/2006 | Nakamura | H02M 1/08 |
| | | | 257/491 |
| 2003/0002311 A1 | 1/2003 | Mori et al. | 363/147 |
| 2016/0313387 A1 * | 10/2016 | Schweizer | H02M 1/088 |

FOREIGN PATENT DOCUMENTS

| | | | | |
|---|---|---|---|---|
| FR | 2816112 A1 | 5/2002 | | H01L 23/64 |
| WO | 2016/198460 A1 | 12/1916 | | H02M 1/088 |
| WO | 2014/168607 A1 | 10/2014 | | H01L 21/205 |

OTHER PUBLICATIONS

International Search Report and Written Opinion, Application No. PCT/EP2016/063051, 14 pages, dated Sep. 1, 2016.

* cited by examiner

POWER CONVERTER HAVING PARALLEL-CONNECTED SEMICONDUCTOR SWITCHES

CROSS-REFERENCE TO RELATED APPLICATIONS

This application is a U.S. National Stage Application of International Application No. PCT/EP2016/063051 filed Jun. 8, 2016, which designates the United States of America, and claims priority to DE Application No. 10 2015 210 796.5 filed Jun. 12, 2015, the contents of which are hereby incorporated by reference in their entirety.

TECHNICAL FIELD

The present disclosure relates to electric converters. The teachings thereof may be embodied in converters designed to transfer an electric power of more than 3 kilowatts referred to as a power converter.

BACKGROUND

Power converters may require specific semiconductor switches, that is to say transistors, for example, which have a sufficiently high current-carrying capacity and reverse voltage so that the electric power of more than 3 kilowatts can be switched using the lowest possible number of semiconductor switches. Said semiconductor switches may be combined in what are known as power semiconductor modules. These power semiconductor modules include semiconductor switches arranged close to one another on a common thermally conductive support. The individual semiconductor switches are wired to terminals by means of bonding wires, by means of which terminals the power semiconductor module is interconnected with the peripheral area. To operate a power semiconductor module of this kind, it is necessary to connect a circuit board, for example, on which, for each semiconductor switch, a gate driver circuit is provided for switching the semiconductor switch. Furthermore, the power semiconductor module must be mounted on a heat sink, to dissipate the heat accumulated in the described support from the power semiconductor module.

Due to the compact, block-shaped physical form and the necessity of the external connection to gate driver circuits, it is difficult to match a power semiconductor module to given power and installation space data. In addition, due to the multiplicity of possible applications for modern converter technology, there are different requirements for power and installation space data depending on the application. However, there is a limited selection of available power semiconductor modules. If there is no suitable power semiconductor module available for an application, a system will use a less than optimal, oversized power semiconductor module, which constitutes an undesirably costly solution.

SUMMARY

The teachings of the present disclosure may be used for reducing the influence of wiring inductances in parallel-connected semiconductor switches in a converter. The electrical converter may include half-bridge circuits, or half-bridges for short, which each have parallel circuits containing a plurality of semiconductor switches.

For example, some embodiments may include an electric converter (2, 4) which is designed to transfer an electric power of more than 3 kilowatts and which has half-bridges (6) each having at least two parallel circuits (13, 14) containing a plurality of semiconductor switches (16), characterized in that the parallel circuits (13, 14) are each formed by base circuits (15) arranged next to one another on a common printed circuit board (21) and each base circuit (15) respectively has one of the semiconductor switches (16) and additionally a gate driver circuit (17) for the semiconductor switch (16), said gate driver circuit being electrically connected to a gate (G) of the semiconductor switch (16) by means of a control line (19), and, in the parallel circuit (13, 14), the shortest control line (19) and the longest control line (19) differ from one another with respect to their respective length (18) by at most the factor of 1.5.

In some embodiments, the length (18) of the longest control line (19) is less than 3 centimeters.

In some embodiments, the control lines (19) are formed by a respective conductor track (23) of the printed circuit board (21).

In some embodiments, in each parallel circuit (13, 14), the respective semiconductor switches (16) thereof are connected in parallel by means of conductor tracks (22) of the printed circuit board (21).

In some embodiments, the semiconductor switches (16) are each mechanically and electrically connected in a wireless manner to the conductor tracks (22) by means of at least one solder layer (30).

In some embodiments, the semiconductor switches (16) are wide-bandgap semiconductor switches.

In some embodiments, a control device (5) of the electrical converter (2, 4) is configured to switch the half-bridges (6) at a switching frequency of more than 30 kilohertz.

In some embodiments, in each parallel circuit (13, 14), the printed circuit board (21) has a substrate (31) made of metal.

In some embodiments, each parallel circuit (13, 14) comprises more than 10, in particular more than 20, base circuits (15).

In some embodiments, all the parallel circuits (13, 14) are arranged on a common printed circuit board (21).

Some embodiments may include a converter (1) having two electrical converters (2, 4) as described above, wherein parallel circuits (13, 14) of the two electrical converters (2, 4) are arranged on a common printed circuit board (21).

BRIEF DESCRIPTION OF THE DRAWINGS

An exemplary embodiment of the teachings of the present disclosure is described below. In this regard.

DETAILED DESCRIPTION

Figure 1:
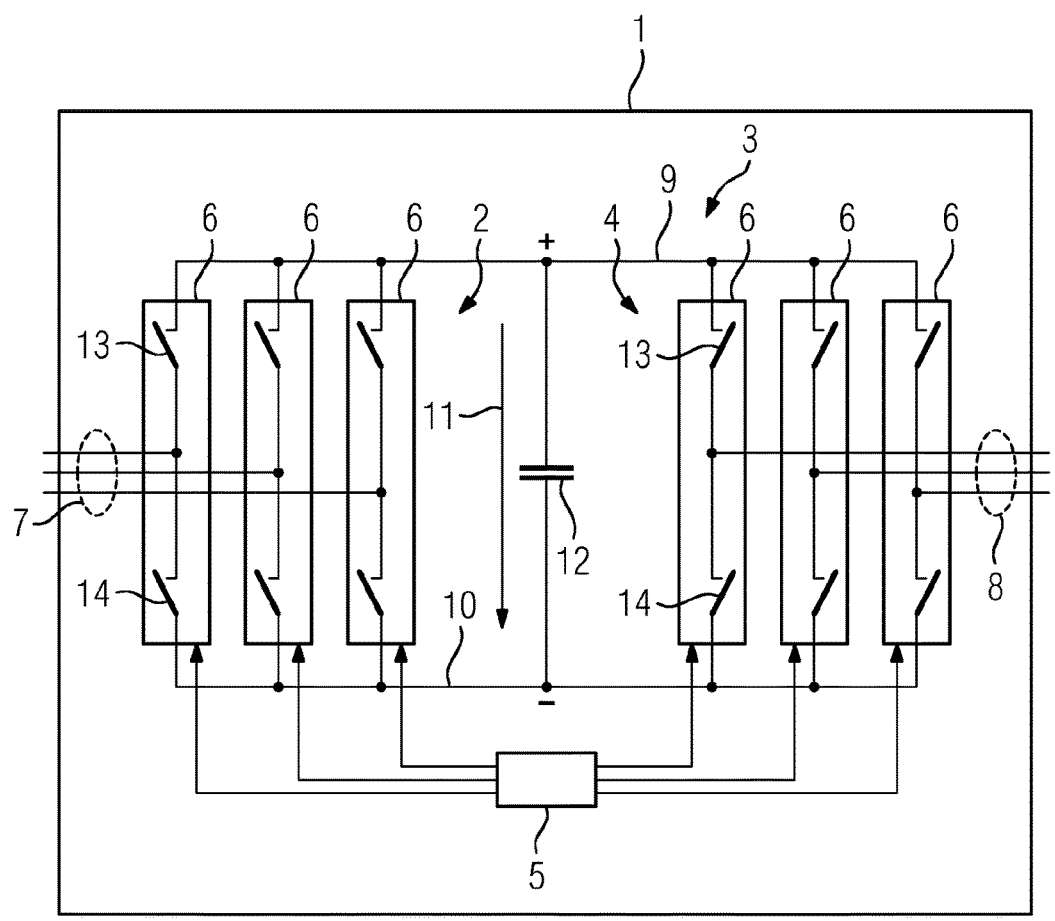
FIG. 1 shows a schematic illustration of an embodiment of the converter according to the teachings of the present disclosure.

In module technology for converters up to now, the current-carrying capacity of semiconductor switches has been realized by module-internal parallel connection of MOSFET (metal-oxide-semiconductor field-effect transistor) chips or IGBT (insulated-gate bipolar transistor) chips. However, this is only possible up to a certain number of semiconductor switches, since the coordinated switching of the semiconductor switches is impaired by the module-internal wiring inductance that increases as the number of semiconductor switches increases. This prevents the use of fast-switching power semiconductors. Until now, in order to obtain parallel circuits having more semiconductor switches, a plurality of power semiconductor modules were connected in parallel and isolated from one another, but were controlled in a coordinated manner.

The teachings of the present disclosure may be embodied in an electric converter, that is to say an inverter or rectifier, which is designed to transfer an electric power of more than 3 kilowatts. In other words, it is a power converter. In particular, there is provision for a transfer of more than 50 kilowatts rated power. Half-bridges each having at least two parallel circuits containing a plurality of semiconductor switches may be provided in the electrical converter. The at least two parallel circuits are created since, in a half-bridge, the AC voltage phase conductor is connected to the positive conductor of the DC voltage side by means of a first parallel circuit, a so-called high-side circuit, and is connected to the negative conductor of the DC voltage side by means of a second parallel circuit, the so-called low-side circuit. A plurality of parallel circuits can also be respectively provided in the high-side circuit and in the low-side circuit, said parallel circuits then being connected again in series to increase the value of the reverse voltage of the half-bridge as a result.

In the electrical converter, the parallel circuits are not formed simply by connecting semiconductor switches in parallel, in which case each semiconductor switch is subsequently wired to the gate driver circuit thereof. Instead, the parallel circuits are each formed by base circuits arranged next to one another on a common printed circuit board. In some embodiments, each base circuit respectively has one of the semiconductor switches of the parallel circuit and additionally a gate driver circuit for the semiconductor switch, said gate driver circuit being electrically connected to a gate of the semiconductor switch by means of a control line. In some embodiments, a semiconductor switch is intended to be understood to mean in particular a transistor, e.g. an IGBT or a MOSFET. In other words, a combination of the semiconductor switch and the gate driver circuit thereof includes a base circuit on a common printed circuit board. Said base circuits are connected in parallel with the parallel circuit. The line length of the control line between a gate driver circuit and the gate of the semiconductor switch is thus independent of the geometric dimensions of the parallel circuit. In other words, the longest control line and the shortest control line differ from one another in regard to their respective length by at most the factor of 1.5. In other words, the control lines are of a similar length. In some embodiments, the control lines are the same length.

In some embodiments, a multiplicity of semiconductor switches can be interconnected to form a parallel circuit, wherein the first semiconductor switch in the parallel circuit and the last semiconductor switch in the parallel circuit are connected to the respective gate driver circuit thereof by means of a control line, independent of the number of semiconductor switches interconnected in the parallel circuit. In contrast, if the semiconductor switches were interconnected to form a parallel circuit and the gate driver circuit were provided on a separate printed circuit board, this would create different lengths of the control lines depending on the physical dimensions of the parallel circuit. The similar length values of the control lines produce a parallel circuit having a particularly large number of semiconductor switches, for example more than 24 semiconductor switches, can also be switched in a coordinated manner, that is to say the semiconductor switches can be switched at the same time with a low degree of technical complexity.

In some embodiments, the length of the longest control line between the semiconductor switch and the gate driver circuit thereof is less than 3 centimeters. The connection between the gate driver circuit and the semiconductor switch also has a low inductance. This permits a particularly high switching frequency of the semiconductor switches during operation of the electrical converter. The values for the switching frequencies emerge, in particular, during pulse-modulated open-loop control of the parallel circuits.

In some embodiments, the control lines may be formed by a respective conductor track of the printed circuit board. As a result, it is not necessary to interconnect the driver circuit with the semiconductor switch by bonding, unlike in the case of a compact power semiconductor module. This additionally reduces the parasitic inductance, which impairs the maximum possible switching frequency.

In some embodiments, in each parallel circuit, the respective semiconductor switches thereof may be connected in parallel by means of conductor tracks of the printed circuit board. This produces a natural frequency of the arrangement of parallel-connected semiconductors set in a targeted manner by prescribing a geometric design or form of the conductor tracks, and a tendency to oscillate during switching of the parallel circuits can thus be reduced in a targeted manner. In other words, said arrangement has a natural frequency at which voltage fluctuations and/or current fluctuations arise when the arrangement is repeatedly switched at this natural frequency. In some embodiments, a geometry of the conductor tracks and/or a position of the electronic modules sets the natural frequency of the arrangement outside an interval of permitted switching frequencies of the parallel circuit.

In some embodiments, the semiconductor switches are each mechanically and electrically connected in a wireless manner to the conductor tracks by means of a solder layer. In other words, the semiconductor switches are not designed, for example, as separate components having pins that are inserted and soldered into the printed circuit board. Instead, each semiconductor switch is placed on the conductor tracks and is soldered thereto by means of a solder layer, e.g. a layer of tin solder. As a result, the connection is particularly short in terms of geometry. A low parasitic inductance is thus achieved. Each semiconductor switch can be switched at a higher switching frequency without this leading to the induction of an overvoltage.

In some embodiments, the semiconductor switches are wide-bandgap semiconductor switches, e.g. semiconductor switches based on silicon carbide or gallium nitride. In contrast to purely silicon-based semiconductor switches, wide-bandgap semiconductor switches can be switched at a higher switching frequency, with the result that a particularly high switching speed during operation of the electrical converter can be achieved, in particular, through combinations using the interconnection by means of the solder layer and the use of conductor tracks for the parallel connection of all the semiconductor switches.

In some embodiments, a control device of the electrical converter may be configured to switch the half-bridges at a switching frequency of more than 30 kilohertz. In this case, each parallel circuit is switched at the switching frequency. To this end, the control device can be provided, for example, based on a microprocessor or an ASIC (application-specific integrated circuit).

In some embodiments, in each parallel circuit, the printed circuit board have a substrate made of metal. The semiconductor switches can be cooled by way of the metal despite the high switching frequencies, with the result that both the conductor tracks and the semiconductor switches can be cooled using one and the same cooling technology by dissipating the heat losses by way of the metal. One low-priced variant provides a printed circuit board based on a plastic, for example based on epoxy resin or glass fiber mats which are soaked in epoxy resin. By using a plastic, the leakage current resistance is particularly high. In addition, a lower parasitic capacitance is produced than when using a metal substrate, which, in particular, causes a lower leakage current at a high switching frequency.

An electric converter in which each parallel circuit comprises more than 10, in particular more than 20, base circuits can be provided by way of the described measures. Nevertheless, an electric converter of this kind having more than 10, in particular more than 20, base circuits having a low degree of technical complexity can be switched in a coordinated manner in such a way that, within each parallel circuit, the semiconductor switches change their electrically conductive state at the same time, in order to switch the semiconductor switches between a blocking and an electrically conductive state as a result.

In the description so far, each parallel circuit can be arranged on a separate printed circuit board. An entire half-bridge can also be arranged on a printed circuit board, that is to say the parallel circuits of a half-bridge are arranged on a common circuit board. There may also be provision for all the half-bridges of the electrical converter, that is to say all the parallel circuits, to be arranged on a common printed circuit board. This makes it particularly easy in terms of technology to manufacture the electrical converter by machine.

In some embodiments, an electric converter can be operated or designed as a rectifier or as an inverter. In some embodiments, a converter has two electrical converters, each of which is respectively an embodiment of the electrical converter as taught herein. The converter may comprise an inverter and a rectifier, each of which is formed by one of the electrical converters. In the electrical converter, the parallel circuits of the two electrical converters may be arranged on a common printed circuit board. On the one hand, the converter can be manufactured by machine, since all the components can be interconnected by means of conductor tracks of the printed circuit board. Furthermore, consistent technology is obtained when producing the converter, since all the components can be arranged on the printed circuit board by means of a wave soldering method or other SMD technology, for example. This makes it particularly expedient and/or feasible to produce the converter in a mass production process.

In the exemplary embodiment described below, the components of the embodiment each represent individual features that can be regarded independently of one another and hence can also be regarded as part of the teachings individually or in a combination other than that shown. Furthermore, the embodiment described can also be augmented by further instances of the already described features. In the figures, elements having the same function are each provided with the same reference symbols.

FIG. 1 shows a converter 1 having a rectifier 2, a DC link, or link for short, 3, an inverter 4 and a control device 5. The rectifier 2 and the inverter 4 each constitute an electric converter. The rectifier 2 and the inverter 4 can each have half-bridges 6, by means of which AC voltage phase lines, or phase lines for short, 7, 8 of the converter 1 are interconnected in a known manner using both a positive line 9 and a negative line 10 of the link 3. The rectifier 2 can generate a DC voltage 11 in the link 3 from the AC voltages of the phase lines 7 by means of the half-bridges 6 in a manner known per se, said DC voltage being able to be stored in a link capacitor 12. The inverter 4 can respectively generate AC voltages from the DC voltage 11 in the phase lines 8 by means of the half-bridges 6.

The converter 1 may operate an electric machine, for example a synchronous machine. For this purpose, the converter 1 can be interconnected with an electric power supply system by means of the phase lines 7 and can be interconnected with the electric machine by means of the phase lines 8.

In the converter 1, the half-bridges 6 are switched or actuated by the control device 5. The control device 5 can be formed in a manner known per se, for example, by electrical and electronic components. It is also possible for a respective control device to be provided for the rectifier 2 and the inverter 4.

The half-bridges each have a so-called high-side circuit 13 and a low-side circuit 14, only some of which are provided with a reference symbol in FIG. 1 for the sake of clarity. The circuits 13, 14 each constitute a parallel circuit containing a plurality of semiconductor switches.

FIG. 2 once again illustrates a half-bridge 6 in more detail. The high-side circuit 13 and the low-side circuit 14 each have parallel-connected base circuits 15. Each base circuit 15 has a semiconductor switch 16 and a gate driver circuit, or driver circuit for short, 17 for the respective semiconductor switch 16. For the purpose of illustration, the drain terminal D, the source terminal S and the gate terminal G of each of the semiconductor switches 16 are illustrated. The semiconductor switch 16 can be an IGBT or MOSFET, for example, in each case. The semiconductor switches 16 are designed based, in particular, on a wide-bandgap semiconductor technology; e.g., they comprise silicon carbide-based and/or gallium nitride-based transistors.

The gate driver circuit may subject a gate capacitance of the gate G to charge reversal during switching of the respective semiconductor switch 16. In the half-bridges 6 of the converter 1, this is possible at a particularly high switching frequency and/or switching speed. In particular, a switching frequency of more than 30 kilohertz is made possible.

To this end, a spacing 18 between the driver circuits 17 and the associated semiconductor switch 16 is so small that a control line 19, by way of which the driver circuit 17 is connected to the gate G, is briefly switched off and, as a result, forms a low wiring inductance. In particular, the spacing 18 is less than 2 centimeters.

Figure 2:
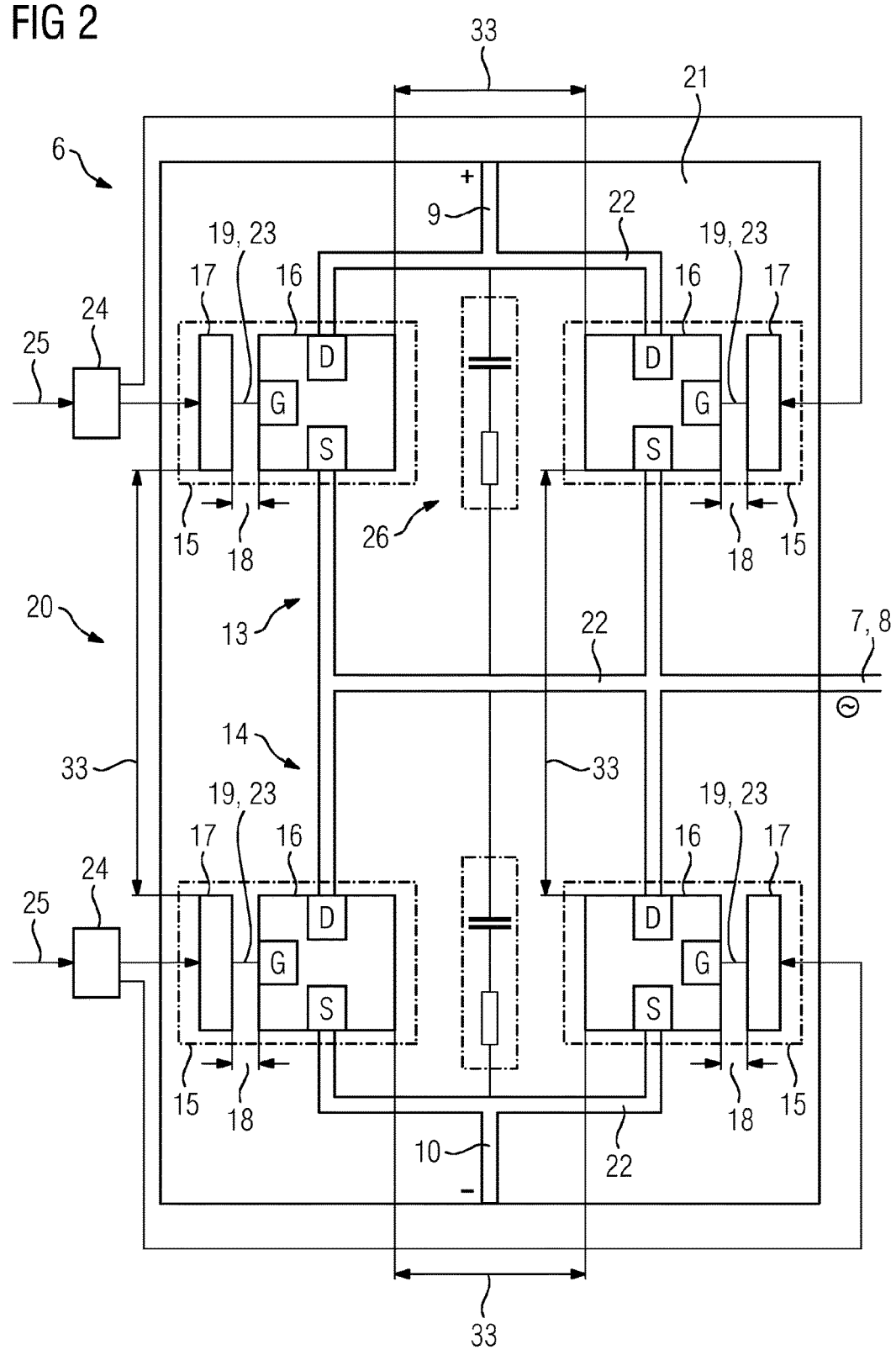
FIG. 2 shows a schematic illustration of a half-bridge of an electric converter of the converter of FIG. 1.

To make said low-inductance arrangement consisting of driver circuit 17 and semiconductor switch 16 possible, the half-bridge 6 is designed in the example shown in FIG. 2 as a circuit arrangement 20, which is characterized in that, in each base circuit 15, the driver circuit 17 and the semiconductor switch 16 are arranged on a common printed circuit board 21. In the example shown in FIG. 2, all the base circuits 15 are arranged on a common printed circuit board 21. The printed circuit board 21 is, in particular, a circuit board, which can be designed as a PCB, for example. The printed circuit board 21 can be designed, in particular, as an IMS.

Conductor tracks 22 made of copper or aluminum can be arranged on the printed circuit board 21, said conductor tracks providing a connection from the base circuits 15 to the positive line 9, the negative line 10 and the respective phase lines 7, 8. In the circuit arrangement 20, the control line 19 is also formed, in particular, by a conductor track 23 on the printed circuit board 21.

Driver logic or a logic circuit 24 can be provided in the circuit arrangement 20 in each case to simultaneously switch the respective parallel-connected semiconductor switches 16 by means of the driver circuit 17 thereof, said driver logic or logic circuit forwarding a control signal 25 from the control device 5 to the two driver circuits 17 of the parallel-connected base circuits 15. The logic circuit 24 can be formed by a control circuit for coordinating the switching times of the base circuits 15.

Furthermore, a snubber circuit 26 can be connected in parallel with the parallel-connected semiconductor switches 16. There may be provision for one respective snubber circuit 26 for each semiconductor switch 16 or a common snubber circuit 26. A snubber circuit 26 can be formed, for example, by a snubber capacitor or an RC element or by a capacitor alone.

The circuit arrangement 20 can carry a current having a current intensity in a range of more than 50 amperes, in particular more than 100 amperes. The parallel circuit shown makes it possible here for each semiconductor switch 16 to only be configured to carry a partial current as the rated current, with the result that the rated current of each semiconductor switch 16 is lower than the rated current of the circuit arrangement 20. A reverse voltage of the semiconductor switches 16 may be higher than 100 volts.

The driver circuits 17 can each be coupled to the control device 5 by means of a DC isolation device, for example an optocoupler. As a result, even at high reverse voltages on the drain-source switching path of the semiconductor switches 16, it is not possible for the reverse voltage to cross to the control device 5, despite the proximity of the driver circuit 17.

Figure 3:
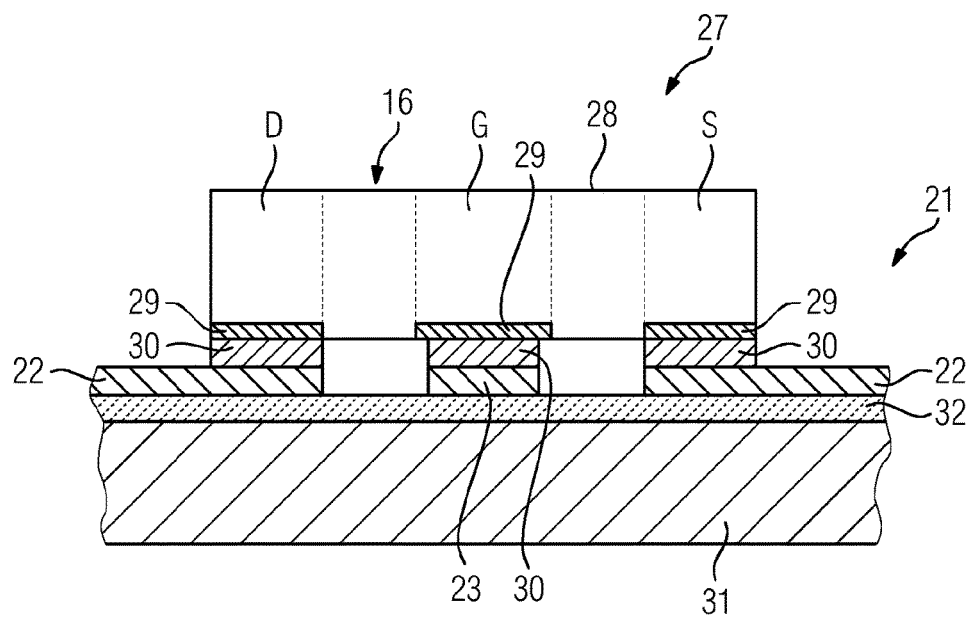
FIG. 3 shows a schematic illustration of a semiconductor switch of the half-bridge of FIG. 2.

FIG. 3 shows how an individual semiconductor switch 16 can be secured to the printed circuit board 21 and interconnected with the conductor tracks 22, 23. Each semiconductor switch 16 can be designed as a separate electronic module 27 in which the semiconductor layers can be arranged in a housing 28. FIG. 3 illustrates how electrically conductive contact areas 29 for the three contacts drain D, source S and gate G can be formed in the housing 28. A solder layer 30 is arranged between the contact areas 29 and the conductor tracks 22, 23, said solder layer being able to be formed by tin solder. The solder layer 30 may have been arranged on the conductor tracks 22, 23 or on the contact areas 29, for example by means of a wave soldering method, and the electronic module 27 may have been soldered to the conductor tracks 22, 23.

FIG. 3 further illustrates how the printed circuit board 21 can be designed as an IMS having a metal substrate 31 and an electrically insulating layer 32 between the substrate 31 and the conductor tracks 22, 23. The substrate 31 can be formed, for example, from aluminum or copper. The insulation layer 32 can be a ceramic layer or a lacquer, for example.

Because the semiconductor switches are provided as separate electronic modules 27, they can be arranged on the printed circuit board 21 in such a way that a respective spacing 33 between two of the electronic modules 27 is more than 3 centimeters. This ensures reliable cooling of the electronic modules 27. The electronic modules 27 can be arranged on the printed circuit board 21 in such a manner that a natural frequency of the circuit arrangement 20 is not equal to the switching frequencies by means of which the control device 5 operates the half-bridges 6.

Figure 4:
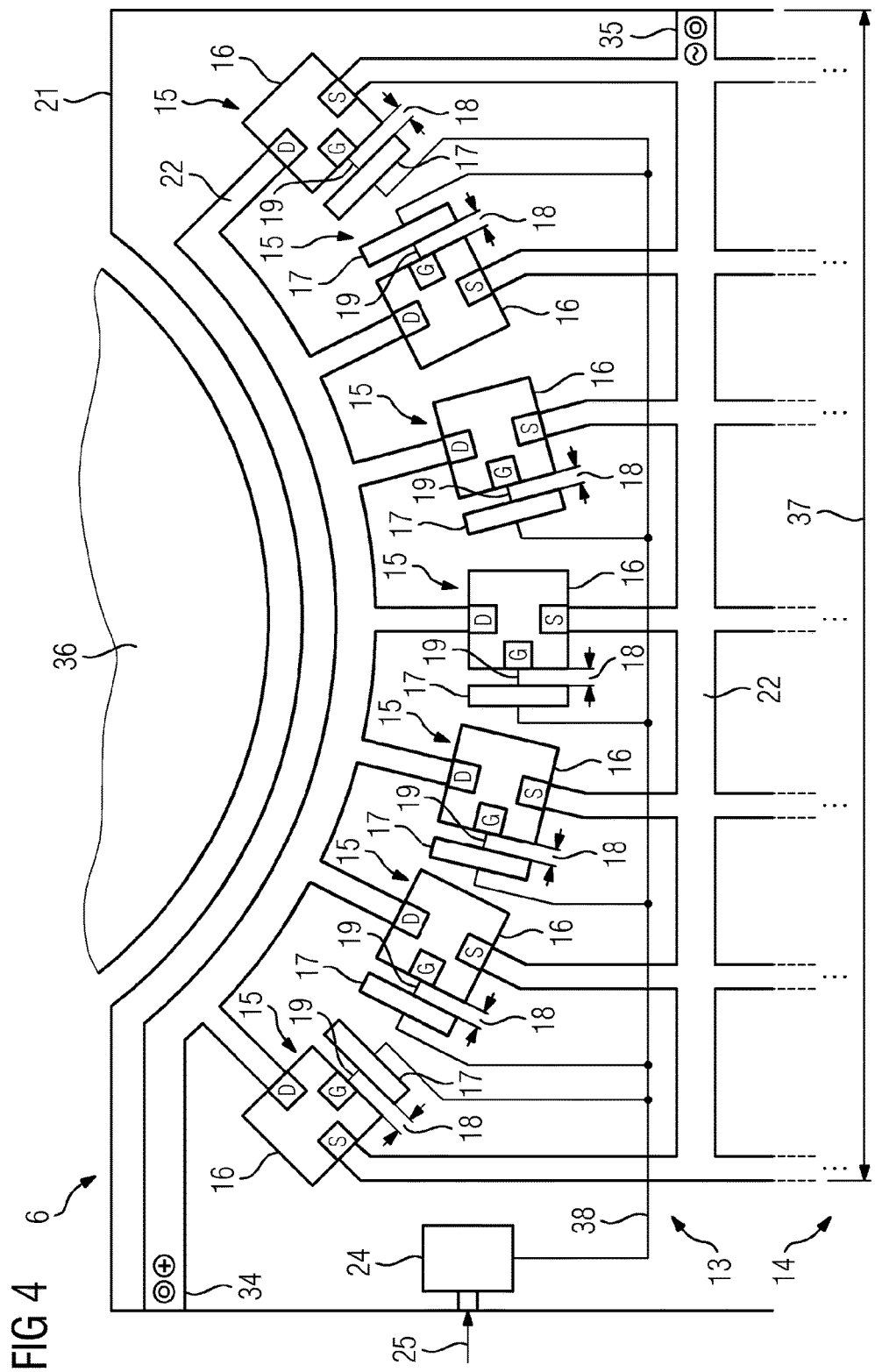
FIG. 4 shows a schematic illustration of a further parallel circuit, as can be provided in the converter of FIG. 1.

FIG. 4 shows a high-side circuit 13 of an electric converter, said high-side circuit constituting a parallel circuit. This can be an alternative embodiment of the high-side circuit 13, which can be provided in the rectifier 2 or the inverter 4 in the converter from FIG. 1. The statements made below with respect to the high-side circuit 13 also apply accordingly to a low-side circuit 14, by way of which the AC voltage connection 35 is interconnected with a negative connection (not illustrated) of the half-bridge 6.

A DC voltage connection 34 and an AC voltage connection 35 are coupled by means of the high-side circuit 13. The base circuits 15 of the high-side circuit 13 are connected in parallel in the described manner by means of conductor tracks 22. Since the semiconductor switches 16 are provided not as a power semiconductor module but rather as individual electronic modules, the high-side circuit 13 could have its layout matched to a shape of an electric machine 36, to the housing of which the converter 1 is intended to be secured. In the example, an arc-shaped arrangement is shown. A number of semiconductor switches 16 has been matched to the power requirement of the electric machine 36. This was also able to be done by designing the printed circuit board 21.

Since the driver circuits 17 are each arranged next to the associated semiconductor switch 16, the control lines 19 of all the base circuits 15 are of a similar length, despite the overall geometric length 37 of the parallel circuit of the high-side circuit 13. In other words, the lengths or spacings 18 have values from which the smallest and the largest value differ by at most a factor of 1.5. To switch all the base circuits 15 at the same time, all the driver circuits 17 are coupled to the logic circuit 24 of the high-side circuit 13 by means of a coupling line 38. Although the driver circuits 17 have differently sized spacings or line lengths than the logic circuit 24, the semiconductor switches 16 can nevertheless be switched at the same time by means of their respective driver circuit 17, since the gate capacitances of the semiconductor switches 16 only have to undergo the charge reversal process via the control line 19.

Nevertheless, simultaneous switching of the semiconductor switches 16 by means of their driver circuit 17 is therefore possible even in the case of a number of semiconductor switches 16 of greater than 5, in particular greater than 10, in particular greater than 20, since the lengths 18 of the control lines 19 differ by at most a factor of 1.5.

Drivers and semiconductor switches 16 can thus be connected in a low-inductance manner by interconnecting separate semiconductor switches 16 on a printed circuit board. In this case, each power component (semiconductor switch 16) is provided with its own driver. This facilitates the ability of the plurality of semiconductor switches 16 to be connected in parallel and the correct actuation thereof to increase the current-carrying capacity. This can be set in an application-based manner by means of the number of parallelized semiconductor switches. The described construction technique allows a component-parallel circuit concept including the necessary circuit peripheral area. There is no longer a dependence on commercial power semiconductor modules and the dimensioning thereof.

By using the metal substrate 31, it is possible to arrange the component parts of the converter 1 no longer in a concentrated manner, but rather the converter 1 can be broken up into individual base circuits. It is thereby possible to divide or distribute the central sources of power loss and to cool them by means of the metal substrate 31. At the same time, the conductor tracks of the printed circuit board 21 make it possible to wire up the semiconductor switches 16 as well. The connection of the driver circuits 17 to the semiconductor switches 16 is also possible by means of conductor tracks. The entire converter 1 can be wired up and efficiently cooled using a single cooling method by using a printed circuit board 21 having a metal substrate 31. In contrast, in the prior art it is necessary to cool the power semiconductor modules and the filter component parts (snubber) and the link capacitor separately using different methods. This is complicated and not easy to install and often expensive.

Overall, the example shows how the invention can provide a parallel circuit of SMD power semiconductor components on a PCB/IMS basis.

What is claimed is:

1. An electric converter to transfer an electric power of more than 3 kilowatts, the electric converter comprising:
    a half-bridge with at least two parallel circuits;
    each of the at least two parallel circuits including a plurality of semiconductor switches;
    each of the at least two parallel circuits including at least two base circuits arranged next to one another on a common printed circuit board; and
    each of the at least two base circuits includes one of the plurality of semiconductor switches and a gate driver circuit for the semiconductor switch;
    each gate driver circuit electrically connected to a gate of the semiconductor switch by a control line; and
    wherein, in each of the at least two parallel circuits, a shortest control line and a longest control line differ from one another with respect to length by no more than a factor of 1.5.

2. The electrical converter as claimed in claim 1, wherein a length of the longest control line is less than 3 centimeters.

3. The electrical converter as claimed in claim 1, wherein each of the control lines comprises a respective conductor track of the common printed circuit board.

4. The electrical converter as claimed in claim 1, wherein, in each of the at least two parallel circuits, the respective semiconductor switches thereof are connected in parallel by conductor tracks of the common printed circuit board.

5. The electrical converter as claimed in claim 4, wherein the plurality of semiconductor switches are each mechanically and electrically connected in a wireless manner to the conductor tracks by a solder layer.

6. The electrical converter as claimed in claim 1, wherein the plurality of semiconductor switches comprise wide-bandgap semiconductor switches.

7. The electrical converter as claimed in claim 1, further comprising a control device configured to switch the half-bridge at a switching frequency of more than 30 kilohertz.

8. The electrical converter as claimed in claim 1, wherein, in each of the at least two parallel circuits, the common printed circuit board comprises a metal substrate.

9. The electrical converter as claimed in claim 1, wherein each of the at least two parallel circuits comprises more than 10 base circuits.

10. The electrical converter as claimed in claim 1, wherein all of the at least two parallel circuits are arranged on the common printed circuit board.

11. A converter comprising:
    two electrical converters, each electric converter comprising a half-bridge with at least two parallel circuits;
    each of the at least two parallel circuits including a plurality of semiconductor switches;
    each of the at least two parallel circuits including at least two base circuits arranged next to one another on a common printed circuit board; and
    each of the at least two base circuits includes one of the plurality of semiconductor switches and a gate driver circuit for the semiconductor switch;
    each gate driver circuit electrically connected to a gate of the semiconductor switch by a control line; and
    wherein, in each of the at least two parallel circuits, a shortest control line and a longest control line differ from one another with respect to length by no more than a factor of 1.5;
    wherein each of the at least two parallel circuits of the two electrical converters are arranged on the common printed circuit board.

* * * * *